United States Patent [19]

Hunt

[11] 4,254,471
[45] Mar. 3, 1981

[54] BINARY ADDER CIRCUIT

[75] Inventor: David J. Hunt, Hitchin, England

[73] Assignee: International Computers Limited, London, England

[21] Appl. No.: 19,765

[22] Filed: Mar. 12, 1979

[30] Foreign Application Priority Data

Apr. 25, 1978 [GB] United Kingdom ............... 16181/78

[51] Int. Cl.³ ............................................. G06F 7/50
[52] U.S. Cl. ................................... 364/784; 307/207; 364/716; 364/786
[58] Field of Search ...................... 364/716, 784, 786; 307/207

[56] References Cited

U.S. PATENT DOCUMENTS

| 3,417,236 | 12/1968 | Utley | 364/716 |
| 3,571,615 | 3/1971 | Kelly | 364/716 X |
| 3,932,734 | 1/1976 | Parsons | 364/786 |

Primary Examiner—Jerry Smith
Attorney, Agent, or Firm—Hane, Roberts, Spiecens & Cohen

[57] ABSTRACT

A binary adder circuit which, in response to a mode selection signal, is forced to operate as if two of its inputs were equal, irrespective of the actual value of those inputs. In this condition, the circuit acts effectively as a connector, coupling two of its inputs direct to the sum and carry outputs. The invention is useful in a circuit arrangement for performing adding and shifting operations.

2 Claims, 2 Drawing Figures

BINARY ADDER CIRCUIT

BACKGROUND TO THE INVENTION

This invention relates to binary adder circuits.

Binary adder circuits are well known in the art. Such a circuit generally has three inputs for receiving three binary digits which are to be added together, and sum and carry outputs at which appear the results of the addition.

The object of the present invention is to provide a binary adder circuit which, as well as performing its basic function as a conventional adder, is also capable of acting as a connector, for coupling its inputs direct to its outputs.

SUMMARY OF THE INVENTION

According to the invention there is provided a binary adder circuit having three inputs and sum and carry outputs, and means selectively operable in response to a mode selection signal for causing the adder to behave as if the first and second of its inputs were receiving the input signal, so as to make the sum output equal to the third input and the carry output equal to the first or second input.

Thus, it can be seen that the circuit has two modes of operation, according to the state of the mode switching signal. In the first mode, the circuit functions as a normal adder, forming the sum and carry outputs in the conventional manner. However, in the second mode, the circuit effectively acts as a connector, coupling two of the input paths to the sum and carry outputs respectively.

The invention utilises a property of a binary adder circuit that when two of its inputs are equal the carry output is equal to these two inputs, while the sum output is equal to the other input. This can be seen by inspection of the following truth-table:

| Inputs | | | Outputs | |
|---|---|---|---|---|
| A | B | C | Sum | Carry |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

In a preferred embodiment of the invention, the adder circuit is of a kind wherein the first and second inputs are combined in an equivalence circuit to produce a control signal which controls the outputs in such a manner that (a) when the control signal denotes equality, the sum output is made equal to the third input and the carry output is made equal to either of the first and second inputs, and (b) when the control signal denotes inequality, the sum output is made equal to the inverse of the third input and the carry output is made equal to the third input, and the means for causing the adder to behave as if the first and second inputs were receiving the same input signal comprises means for forcing the control signal to denote equality, irrespective of the values of the first and second inputs.

BRIEF DESCRIPTION OF THE DRAWINGS

One embodiment of the invention will now be described by way of example with reference to the accompanying drawings of which

DESCRIPTION OF THE PREFERRED EMBODIMENT

Figure 1:
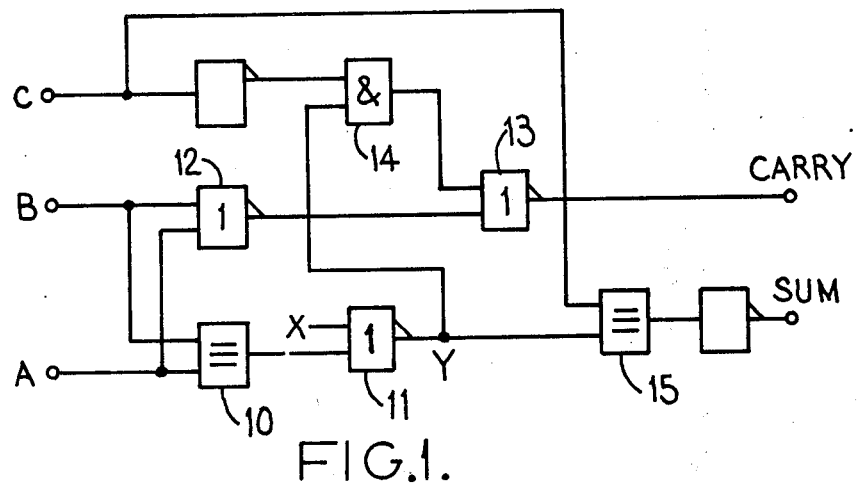
FIG. 1 is a circuit diagram of the adder.

Referring to FIG. 1, the adder has three data inputs A, B and C, and SUM and CARRY outputs. Inputs A and B are combined in an equivalence gate 10, the output of which is applied to one input of a NOR gate 11, the other input of which receives a mode control signal X. The output of the NOR gate 11 constitutes a control signal Y which, as will be explained, determines the way in which the SUM and CARRY outputs are formed.

The inputs A and B are also applied to another NOR gate 12, the output of which is connected to one input of a further NOR gate 13. The other input of this NOR gate 13 is connected to the output of an AND gate 14, while the output of the gate 13 is connected to the CARRY output. One input of the AND gate 14 receives the inverse of the third input C, while the other receives the control signal Y.

The control signal Y is also connected to one input of another equivalence gate 15, the other input of which receives the third input C. The output of gate 15 is inverted and applied to the SUM output.

The adder has two modes of operation, determined by the mode control signal X. When X=0, the circuit functions as a normal adder, but when X=1 it acts as two separate signal paths, one connecting the C input to the SUM output and the other connecting the OR of the A and B inputs to the CARRY output.

Adder mode (X=0)

In this mode, when A=B, the control signal Y is equal to "0". Hence, the SUM output is equal to the C input and the CARRY output is equal to the OR of A and B (since the AND gate 14 is disabled by Y=0). When, on the other hand, A and B are unequal, the control signal Y equals "1". Hence, the SUM output is equal to the inverse of the C input, while the CARRY output equals the C input (the output of NOR gate 12 being zero since either A or B must be "1").

It can be seen that in this mode the inputs and outputs of the adder obey the truth table for a conventional adder, as given above.

Shift mode (X=1)

In this mode, the control signal Y is forced to "0", irrespective of the values of the inputs. Hence, the SUM output equals the C input and the CARRY output equals the OR of the A and B inputs.

Figure 2:
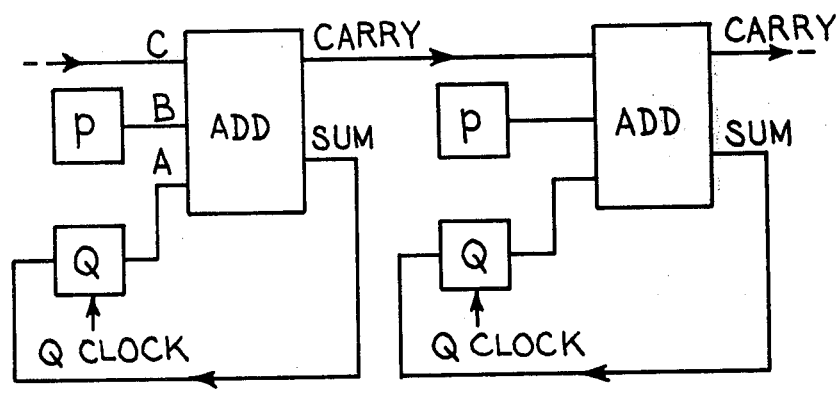
FIG. 2 shows the adder incorporated into a combined adder/shifter circuit.

Referring now to FIG. 2, this shows one possible application for the adder described above, in a multi-bit adder/shifter circuit.

In this circuit, a first multi-bit operand is held in a series of single-bit registers P, and a second multi-bit operand is held in a series of single-bit registers Q. Each pair of registers P and Q is connected to the B and A inputs respectively of an adder ADD of the kind shown in FIG. 1. The SUM output of each adder is connected back to the input of the associated Q register and can be gated into that register by applying a Q clock signal to it. The CARRY output of each adder is connected to the C input of the right-hand neighbouring adder.

This circuit has two modes of operation.

(a) In the first mode, each adder has its mode control signal $X=0$ and hence functions as a normal adder. Thus, the adders form the sum of the two multi-bit operands, with ripple carry between the neighbouring bits from the least significant (left-hand) end to the most significant (right-hand) end. After a delay sufficient to allow the ripple carry to pass the whole length of the circuit, a Q clock signal is applied to all the Q registers, so as to gate the result into these registers.

(b) In the second mode, each adder has $X=1$, and therefore operates in the shift mode described above. Moreover, the P registers are all disabled, making the B inputs all zero. Hence, the CARRY output of each adder equals the A input, and the SUM output equals the C input.

It can be seen that the contents of each Q register pass through the associated adder to the CARRY output, and thence to the C input of the next adjacent adder. The signal then passes through that adder to the sum output, and thence to the input of the associated Q register. Hence, it can be seen that, at the next Q clock signal, the contents of each Q register are shifted rightwards into the next adjacent Q register in the series.

What is claimed is:

1. A binary adder circuit having three inputs and sum and carry outputs, comprising:
   (a) an equivalence circuit connected to the first and second inputs for producing a control signal having a first value when those inputs are equal and a second value when they are not equal;
   (b) first circuit means, connected to the third input and responsive to the control signal, for producing a sum signal equal to the third input when the control signal has its first value and equal to the inverse of the third input when the control signal has its second value, the sum signal being applied to the sum output;
   (c) second circuit means, connected to the three inputs and responsive to the control signal, for producing a carry signal equal to either of the first and second inputs when the control signal has its first value and equal to the third input when the control signal has its second value, the carry signal being applied to the carry output; and
   (d) means operative in response to a mode control signal for forcing the control signal to its first value irrespective of the values of the first and second inputs, thereby making the sum output equal to the third input and the carry output equal to the first or second input.

2. An information processing arrangement comprising a series of binary adder circuits in accordance with claim 1, each adder circuit having first and second single-bit registers connected to its first and second inputs respectively, means for connecting the sum output of each adder circuit to the input of the first register associated with it, and means for connecting the carry output of each adder circuit to the third input of the next adder circuit in the series.

* * * * *